United States Patent
Jeraj et al.

(10) Patent No.: US 10,103,908 B1
(45) Date of Patent: Oct. 16, 2018

(54) LINEAR EQUALIZERS FOR OUTPHASING AMPLIFICATION

(71) Applicant: L3 Technologies Inc., New York, NY (US)

(72) Inventors: Janez Jeraj, Farmington, UT (US); Johnny M. Harris, Layton, UT (US); David G. Landon, Bountiful, UT (US); William K. McIntire, Sandy, UT (US)

(73) Assignee: L3 Technologies Inc., New York, NY (US)

( * ) Notice: Subject to any disclaimer, the term of this patent is extended or adjusted under 35 U.S.C. 154(b) by 0 days.

(21) Appl. No.: 15/593,712

(22) Filed: May 12, 2017

Related U.S. Application Data

(60) Provisional application No. 62/335,607, filed on May 12, 2016.

(51) Int. Cl.
*H04L 25/03* (2006.01)

(52) U.S. Cl.
CPC .. *H04L 25/03057* (2013.01); *H04L 25/03343* (2013.01); *H04L 2025/03681* (2013.01); *H04L 2025/03783* (2013.01)

(58) Field of Classification Search
USPC .................................................. 375/346, 232
See application file for complete search history.

(56) References Cited

U.S. PATENT DOCUMENTS

| | | | | |
|---|---|---|---|---|
| 6,285,412 | B1* | 9/2001 | Twitchell | H03F 1/3247 348/608 |
| 6,570,918 | B1* | 5/2003 | Rademacher | H04B 1/7115 375/147 |
| 2002/0164966 | A1* | 11/2002 | Meehan | H04L 25/03146 455/226.1 |
| 2007/0237270 | A1* | 10/2007 | Mezer | H04B 3/23 375/346 |
| 2016/0322993 | A1* | 11/2016 | Yamanouchi | H03F 1/0294 |

* cited by examiner

*Primary Examiner* — Eva Puente
(74) *Attorney, Agent, or Firm* — Workman Nydegger

(57) ABSTRACT

Embodiments are directed to an apparatus, method and system for relative or absolute equalization of two or more channels. The apparatus includes a receiver that receives a variable-envelope signal, a self-consistent outphasing separator that splits the received variable-envelope signal into constant-envelope signals, and linear pre-equalizers that equalize the constant-envelope signals relative to each other or to some target. The apparatus also includes an analog combiner that combines the constant-envelope signals, and a feedback loop with a processor that receives the combined constant-envelope signals as inputs, analyzes the combined constant-envelope signals to identify pre-equalization inputs that, when applied to the linear pre-equalizers, will equalize the constant-envelope signals, and provide the identified pre-equalization inputs to the linear pre-equalizers, so that the combined constant-envelope signals are equalized relative to each other or to some target. Adaptive algorithms use a dedicated calibration signal, regularly transmitted (data) signal or combination of the two.

20 Claims, 7 Drawing Sheets

LINEAR EQUALIZERS FOR OUTPHASING AMPLIFICATION

CROSS-REFERENCE TO RELATED APPLICATIONS

This application claims priority to and the benefit of U.S. Provisional Patent Application No. 62/335,607, entitled "Linear Equalizers for Outphasing Amplification," filed on May 12, 2016, which application is incorporated by reference herein in its entirety.

BACKGROUND

Outphasing, or linear amplification with nonlinear components (LINC), allows input signals to be amplified by highly efficient nonlinear power amplifiers operating in nonlinear regions, including at or near saturation. Each variable-envelope input signal is separated into two constant-envelope component signals. These constant-envelope signals can be processed using a chain of analog components including mixers or amplifiers that have nonlinear input-output characteristics. The two constant-envelope signals are then combined using an analog combiner to create an amplified replica of the original signal. However, due to physical differences in the analog components as well as the frequency response of the analog combiner, the amplified output signal is not a perfect amplified reconstruction of the input signal. Indeed, these imperfections in analog components may combine to introduce multiple spectral impurities into the output signal, and distort the signal in other ways.

Conventionally, backoff or nonlinear analog or digital pre-equalization (DPD) is applied to decrease nonlinear signal distortion of the signals going through the analog signal chain. Analog pre-equalization has very limited performance, while DPD is complex and inefficient. Perfect linearizations are virtually impossible. DPD's complexity is manifested in complex algorithms, requiring constant updates and additional hardware in the form of feedback loops. Additionally, due to complex algorithms, a significant amount of power is consumed in digital signal processor (DSP), field programmable gate array (FPGA), application-specific integrated circuit (ASIC), or other integrated circuits, lowering overall system efficiency. These efficiency losses are purely and directly converted to heat which is nearly impossible to recycle.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein are directed to an apparatus, method and system for relative (and absolute) equalization of two or more channels. In one embodiment, such an apparatus includes the following: a receiver configured to receive a variable-envelope signal, an outphasing separator configured to split the received variable-envelope signal into first and second constant-envelope signals, a first linear pre-equalizer configured to equalize the first constant-envelope signal relative to the second constant-envelope signal, and a second linear pre-equalizer configured to equalize the second constant-envelope signal relative to the first constant-envelope signal. In some cases, only a single pre-equalizer is present. The outphasing separator is self-consistent, which enables effective pre-equalization.

The apparatus also includes an analog combiner configured to combine the first and second constant-envelope signals, as well as a feedback loop that has a processor configured to receive the combined first and second constant-envelope signals as inputs, analyze the received combined first and second constant-envelope signals to identify pre-equalization inputs that, when applied to the first and/or the second linear pre-equalizers, equalize the first and/or second constant-envelope signals relative to each other and/or to some absolute value such as flat response, and provide the identified pre-equalization inputs to the first and/or the second linear pre-equalizers, so that the combined first and second constant-envelope signals are equalized relative to each other. The feedback loop can be of a temporary nature. One such example would be a loop that is used at the calibration stage but is removed or inactive during normal transmitter operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of their scope. The embodiments will be described and explained with additional specificity and detail through the use of the accompanying drawings in which.

DETAILED DESCRIPTION

Embodiments described herein are directed to an apparatus, method and system for relative equalization of two or more channels. In one embodiment, an apparatus that provides relative equalization of two or more channels includes the following: a receiver configured to receive a variable-envelope signal, an outphasing separator configured to split the received variable-envelope signal into first and second constant-envelope signals, a first linear pre-equalizer configured to equalize the first constant-envelope signal relative to the second constant-envelope signal, and a second linear pre-equalizer configured to equalize the second constant-envelope signal relative to the first constant-envelope signal. The outphasing separator is self-consistent, which enables effective pre-equalization.

The apparatus also includes an analog combiner that combines the first and second constant-envelope signals, as well as a feedback loop that has a processor configured to receive the combined first and second constant-envelope signals as inputs, analyze the received combined first and second constant-envelope signals to identify pre-equalization inputs that, when applied to the first and/or the second linear pre-equalizers, equalize the first and/or second constant-envelope signals relative to each other, and provide the identified pre-equalization inputs to the first and/or the second linear pre-equalizers, so that the combined first and second constant-envelope signals are equalized relative to each other and/or to some absolute value such as flat response.

At least some embodiments are directed to apparatuses and methods for providing linear equalizers for outphasing amplification. Indeed, the embodiments described herein may be applied to I/Q base band sampling for increased spectral spurious-free dynamic range or IF or RF signal, and may also be applied in multi-input multi-output (MIMO) signaling. The apparatuses and methods of these embodiments may be configured to provide improved spectral purity of output signals when using outphasing in combination with power amplification. Linear pre-equalizers included in the apparatus are designed to pre-equalize for distortion caused by analog components and to further provide an amplified signal with a high level of spectral purity and signal shaping.

Outphasing, as the term is used herein, transforms a variable-envelope signal into two constant-envelope signals. This is generally shown in the component diagram 100 of FIG. 1. A variable-envelope signal is either provided by a variable-envelope signal generator 101, or is received from some other source. The outphasing separation unit 102 (or "outphasing separator" herein) transforms the variable-envelope signal into two constant-envelope signals. The two constant-envelope signals generally flow through a chain of analog and/or digital components.

Figure 1:
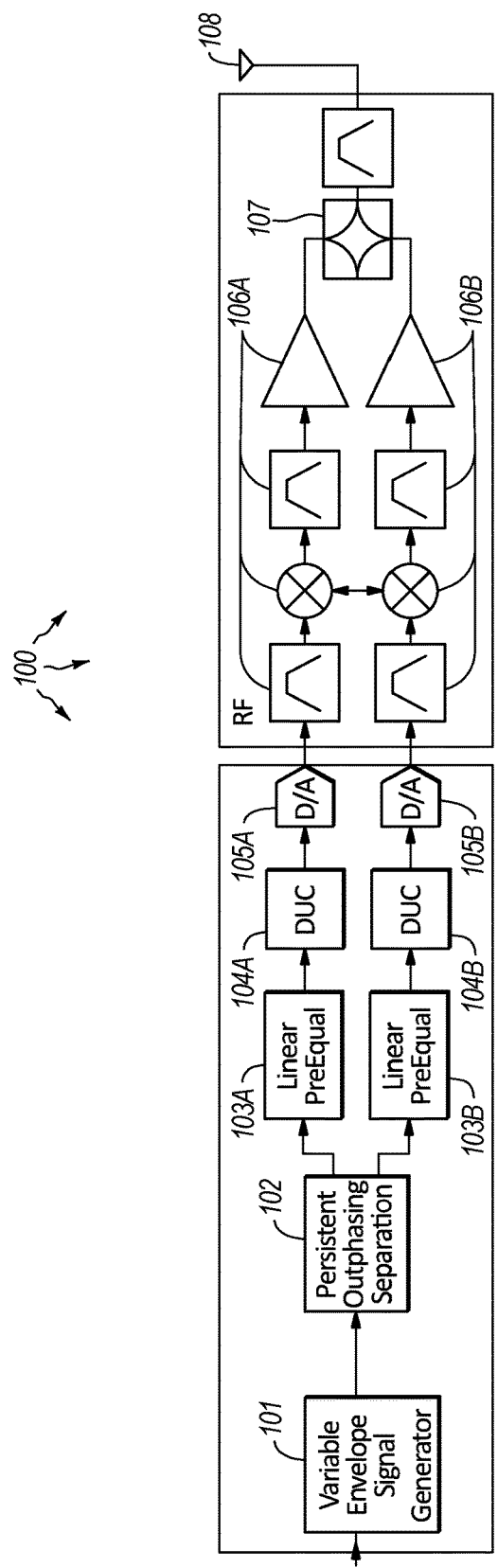
FIG. 1 illustrates an electronic component architecture in which embodiments described herein may operate including providing relative equalization of two or more channels.

For instance, a first constant-envelope signal may travel along the upper path shown in FIG. 1 through components of a linear pre-equalizer 103A, a digital up-converter 104A, a digital-to-analog converter 105A and an analog component chain 106A with filters, mixers and power amplifiers. The signal then goes to an analog combiner 107 and potentially to another filter which removes harmonics or other unwanted signal characteristics.

The second constant-envelope signal may travel along the lower path through components 103B, 104B, 105B and 106B to the combiner 107, where the first and second signals are then combined and sent to other components including potentially such as Analog-to-Digital Converters (ADC) or a spectrum analyzer 109 for analysis, to a computing system with a processor and software 110 for determining an appropriate amount of pre-equalization, and/or to an antenna 108. It will be understood that while certain components are shown in each of the respective component chains, any one or more of the components may be omitted or replaced with another component. Other components may also be added thereto, as long as each chain has substantially the same set of components.

Within the chain of components, the two constant-envelope signals may be amplified by highly-efficient, highly-nonlinear power amplifiers operating at or near saturation. The amplified constant-envelope signals are then summed with an analog power combiner 107 at the output to produce an amplified version of the variable-envelope input signal. Outphasing provides for each amplifier to operate in an efficient but nonlinear mode, while the final output can be highly linear. Due to differences between the two component paths and further due to the frequency response of the analog combiner, the analog combination may not produce a perfect amplified reconstruction of the input signal. Embodiments described herein increase the spectral purity of the output signal. These embodiments introduce linear (relative or absolute) pre-equalizers (103A and 103B) that equalize for the distortions of the analog paths, and enable an amplified output signal with a high level of spectral purity.

Figure 2:
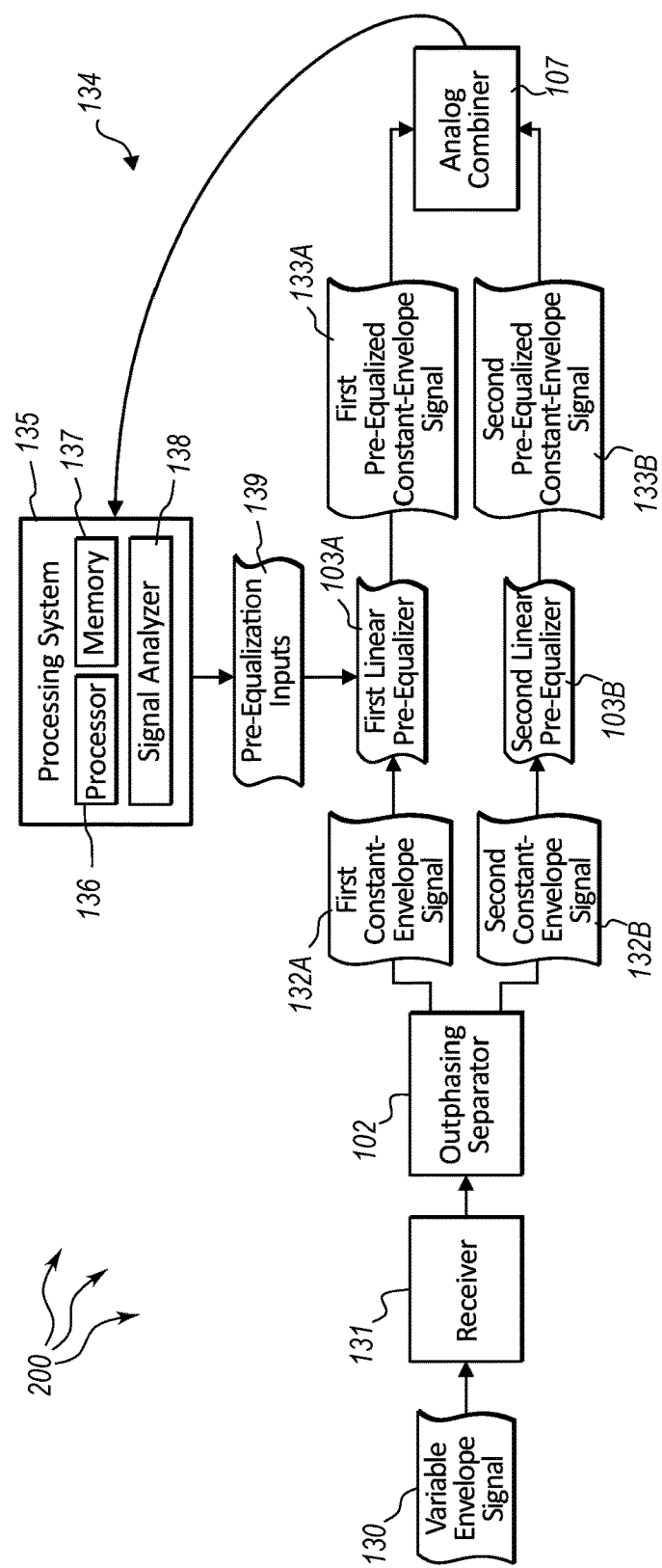
FIG. 2 illustrates an alternative electronic component architecture in which embodiments described herein may operate.

In one specific embodiment, as shown in FIG. 2, an apparatus 200 is provided for outphasing amplification. The apparatus 200 includes a receiver 131 configured to receive a variable-envelope signal 130. The receiver may receive the variable-envelope signal 130 directly from a signal generator (e.g. 101 of FIG. 1) or from an intermediary component or device. An outphasing separator 102 splits the received variable-envelope signal into first and second constant-envelope signals 132A and 132B. The apparatus further includes first and second linear pre-equalizers 103A/103B that are configured to equalize the first constant-envelope signal relative to 132A to the second constant-envelope signal 132B.

Alternatively, the pre-equalizers 103A/103B may be configured to pre-equalize the first and second constant-envelope signals 132A/132B to a common (flat) target. Relative equalizers need to only account for the differences between the two chains, a task which, at least in some cases, is easier to perform than a full (absolute) equalization to some target such as flat response. Use of relative equalization allows the embodiments herein to be performed with finite length equalizers, thereby reducing the cost function as compared to traditional equalization. Relative equalization also better balances equalization against power inefficiencies caused by increasing peak-to-average power ratio.

The apparatus 200 further includes an analog combiner 107 configured to combine the first and second constant-envelope signals, as well as a feedback loop 134 that includes at least one processing system 135 with a processor 136, memory 137 and a signal analyzer 138 configured to receive the combined first and second constant-envelope signals as inputs, analyze the combined first and second constant-envelope signals to identify pre-equalization inputs that, when applied to the first or the second linear pre-equalizers, equalize the first and second constant-envelope signals relative to each other (or to a common flat target). The identified pre-equalization inputs 139 are then provided to the first or the second linear pre-equalizers (103A/103B).

In this manner, the combined first and second constant-envelope signals are equalized relative to each other (or to the common flat target). The processor 136 may be realized as a microprocessor or other hardware-based processing component. For example, in some implementations, the processing system 135 may be or include an application-specific integrated circuit (ASIC) or a field programmable gate array (FPGA).

The apparatus may also include analog component chains (106A/106B of FIG. 1) through which the first and second constant-envelope signals 132A/132B travel. As shown in FIG. 1, the apparatus 100 may include a first analog component chain 106A that includes various analog electrical components configured to receive and process the first constant-envelope signal 132A, as well as a second analog component chain that includes analog electrical components configured to receive and process the second constant-envelope signal 132B. The analog component chains may be made up of filters, mixers, amplifiers and other analog components (106A).

These components may perform further conditioning of the signal including filtering for certain frequencies, mixing signals and performing power amplification. The analog combiner 107 is configured to sum or combine the constant-envelope signals together into a single output signal. This output signal is then typically fed to the feedback loop 134 when optimizing for distortion, and/or to the antenna 108 for transmission to outside receivers or other entities.

The apparatus of FIG. 1 may also include digital components. For example, the outphasing separator 102 may be a digital component capable of separating a variable-envelope input signal into two constant-envelope output signals. A digital up-converter (DUC) 104A may be implemented in conjunction with a digital to analog converter (D/A) 105A to up-convert a digital signal and then change it to an analog signal. Other digital and/or analog components may also be used within the apparatus.

Upon receiving the combined signal from the signal combiner 107, the spectrum analyzer 109 (see e.g., FIG. 4A and 4B) (or some other signal analyzer 138 of FIG. 2) may perform analysis on the combined signal. The analyzer 109 is considered in broad terms, where it could be not only an instrument but any apparatus that can produce an analysis of the signal. The analyzer 109 may be used in conjunction with the equalizer tap search algorithm 110 implemented in software or hardware running on a general or specific purpose computing system.

The equalizer tap search software or hardware of 110 may be configured to analyze the signals provided by the analyzer 109, and make determinations as to how the input signals could be pre-equalized so that upon combining, the distortions sum to zero and cancel each other out. The hardware/software 110 may then provide pre-equalization inputs 139 that resolve physical, component-based differences introduced in the first and second analog component chains (106A/106B).

Each pre-equalizer 103A/103B may be individually adjusted. The equalizer tap search algorithm 110 may, for example, determine that one pre-equalizer is to be adjusted and the other is not to be adjusted, or that one is to be adjusted more than the other, or that only one pre-equalizer is used/implemented. The adjustments may be applied to compensate for relative signal differences that result from small variances in the analog components of each analog component chain. In some cases, the components themselves may be monitored for temperature, for example. By knowing the temperature of the components, a lookup table may be accessed to determine how the components should be behaving, and adjustments to the taps in the pre-equalizers can be made accordingly, allowing for operation without a feedback loop.

In some cases, the variable-envelope signal provided by the variable-envelope signal generator 101 is a two-tone signal. This two-tone signal is run through the outphasing separation component 102, and subsequently through the analog chains 106A/106B. The spectrum analyzer 109 may analyze the spectrum, and the equalizer tap search software 110 may then train the pre-equalizers 103A/103B so that only two amplified tones can be seen on the spectrum analyzer, without any (or at least very few and low-level) Inter-Modulation Distortion (IMD) products that are created by non-linear functions of the amplifier and differences in analog chains. This is referred to herein as a "two-tone test" or "two-tone calibration."

The two-tone test identifies where inter-modulation products are building within the analog component chain. Then using that knowledge, the equalizer tap search algorithm 110 can identify which gain and phase adjustments (or their equivalents) should be made as a function of frequency in order to remove the group delay and ripple variation between the two chains. Removal of this relative variation enables accurate (hi-fidelity) reconstruction of the input signal. The equalizer tap search algorithm 110 can identify pre-equalization inputs that, when applied at each of the pre-equalizers, pre-equalize the signals in such a manner that after traveling through the analog component chain, the signal distortion (i.e. IMDs) sums to zero or some other very low value.

Once these inputs are identified, they are applied at the pre-equalizers. Accordingly, the pre-equalizers are adjusted according to feedback based on the two-tone signal. Once the apparatus is properly calibrated, and the proper amount of pre-equalization is identified, the apparatus may then transmit data in a data signal. The feedback loop may even be omitted. The pre-equalizers may, in some implementations, run without a feedback loop relying on pre-calibrated values in a mechanism such as look-up table. The look-up table may exhibit dependencies on parameters such as temperature, signal power, aging etc. The pre-equalizers may, in other implementations, run with a feedback loop relying on constant updates supported by the feedback loop and appropriate adaptive algorithms. Adaptations may be run during normal signal transmissions, and thus use the transmit signals.

At least one optimization function of the adaptive algorithm is that of minimizing IMD products as measured at the output of the (analog) combiner 107. Over time, operating characteristics of the analog components in the component chains may change. As such, the first and second pre-equalizers may be continually adjusted using a two-tone signal, or using the data signal itself. Distortions may be identified in the data signal in a similar manner as with the two-tone signal, using the spectrum analyzer 109 (and/or analog to digital converter) and equalizer tap search algorithm 110.

Once the proper pre-equalization inputs have been determined, the pre-equalizer inputs 139 may be adjusted accordingly. Additionally, signal chain characteristics may change with varying operating temperatures and operating points. As such, the first and second pre-equalizers may be continually adjusted using a two-tone signal, or using the data signal itself. Alternatively, pre-equalizers may be continually adjusted using a pre-populated look-up table with temperature and/or operating points as inputs.

The apparatus may be used in a variety of different contexts, including with a plurality of pipelined analog-to-digital converters (ADCs), such as those in time-interleaved architectures. For instance, these ADCs may differ from each other slightly, and each may introduce signal distortion in a different manner. Accordingly, using the feedback loop described herein, an appropriate pre-equalization signal may be identified and applied to adjust the pre-equalizer filters so that the signals are equalized relative to each other. The relative equalization provided by the apparatus may also be used in IQ or baseband sampling, IF or RF sampling or in other applications such as MIMO that use components that may introduce varying amounts of distortion.

The feedback loop 134 can be implemented in at least two forms. The first form of the feedback loop is a temporary feedback loop, where the loop is established at calibration only and calibration tables are built that have various inputs such as the temperature of the analog components. These calibration tables are filled with linear pre-equalizer filter 103A/103B coefficients using different operating temperatures at a calibration time. Calibration can be one-time at the production of the system and/or periodic (e.g., once a year) such as it is done with measurement instruments.

The apparatus in such a configuration typically has one or more temperature sensors that provide algorithms with necessary information regarding how to properly use the appropriate pre-equalizer coefficients from the calibration table. Such a feedback loop can be built from instruments such as a spectrum analyzer and/or a processing device. Other more specialized hardware and/or software may also be used. After the calibration is done, the feedback loop may be omitted.

The second form of the feedback loop is a permanent feedback loop, where the loop is built as an integral part of the apparatus. The feedback loop is built using hardware and/or software in processing system 135. The hardware can be simple or complex, but in at least one embodiment, the hardware is limited and is only powerful enough to support a small fraction of the overall spectrum that the system supports at one time. This can save on battery life in cases where the processing system 135 is a mobile device or otherwise runs on battery power. The calibration is performed by scanning over the entire expanded spectrum and over temperature. The feedback loop is run at initial calibration but also at other specified times. Such a system can not only accommodate temperature changes but also other factors such as aging of the parts, etc.

In some embodiments, analog or digital components may be provided for scaling along the signal chain. These components, alone or in combination with algorithm implemented in software or hardware, may determine when and where to apply scaling to the signal. The scaling may be applied to preserve relative balance between two outphasing signals, for example, that cannot have numerical results overflow when performing digital realization. For instance, when performing signal outphasing separation, there are two signals that, when digitally filtered by the linear pre-equalizer, may have a gain applied, and may be outside of a specified range (e.g. from −1 to +1). After going through the filter, a gain may be applied, and the signal may be outside of −1 and +1, thereby causing overflow issues. As such, the signal can be scaled back to within the −1 to +1 range. As the processing is non-linear, both analog component paths are scaled by the same constant to avoid introducing distortion.

The approaches described herein are frequency agnostic and work from very low frequencies to very high frequencies. The approaches described herein are also modulation agnostic and support various waveforms including hopping, spread, OFDM and high-order modulations.

At least in some cases, the pre-equalizers 103A/103B and other filtering components assume that the signal separation 102 implements self-consistent outphasing signal separation. A self-consistent outphasing signal separator enables implementation of two linear pre-equalizers (103A and 103B) that equalize for the distortions of the analog paths, and further enables an amplified output signal with a high level of spectral purity, without filters introducing distortions due to abrupt changes in the phase of the signal. The term "self-consistent" indicates that phase ambiguities in the signal are removed, such that there are no abrupt phase changes between samples taken at different points in time. This provides a continuous undistorted signal which stays continuous throughout the chain of components. These concepts will be explained further below with regard to method 300 of FIG. 3.

Figure 3:
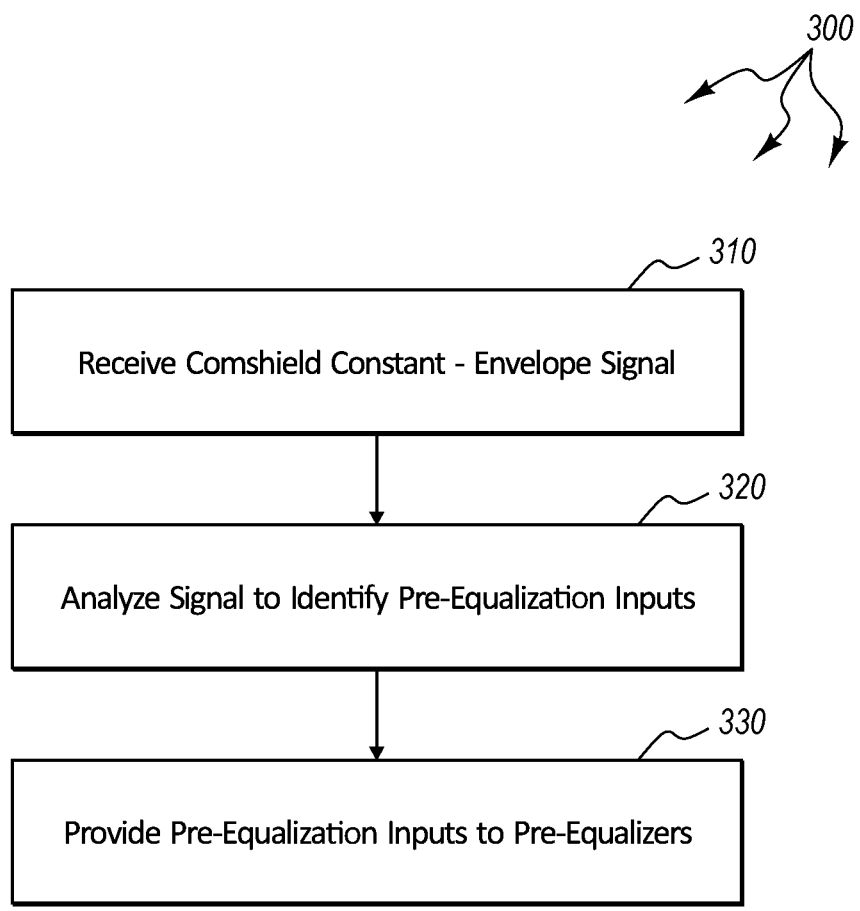
FIG. 3 illustrates a flowchart of an example method for performing a fundamental optimization function using an adaptive algorithm to minimize intermodulation distortions as measured at the output of a combiner.

In view of the systems and architectures described above, methodologies that may be implemented in accordance with the disclosed subject matter will be better appreciated with reference to the flow chart of FIG. 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 3 illustrates a flowchart of a method 300 for performing a fundamental optimization function using an adaptive algorithm to minimize intermodulation distortions as measured at the output of a combiner. The method 300 will now be described with frequent reference to the components of apparatuses 100 and 200 of FIGS. 1 and 2, respectively.

An apparatus (200 of FIG. 2) is provided for relative equalization of two or more channels. The apparatus 200 includes a receiver 131 configured to receive a variable-envelope signal 130. The variable-envelope signal may be received from a variable-envelope signal generator 101 or from another signal source. The apparatus 200 also includes an outphasing separator 102 that splits the received variable-envelope signal 130 into first and second constant-envelope signals 132A/132B. Once split, these signals are respectively sent to a first linear pre-equalizer 103A that equalizes the first constant-envelope signal 132A relative to the second constant-envelope signal 132B, and a second linear pre-equalizer 103B that equalizes the second constant-envelope signal 132B relative to the first constant-envelope signal 132A. It should be noted that, in apparatus 200, the two signals are equalized relative to each other, or to a specified value. This allows the apparatus to generate a signal that is substantially free from non-linearities or other signal impurities.

The apparatus 200 further includes an analog combiner 107 configured to combine the first and second constant-envelope signals 132A/132B into a single, constant-envelope output signal which is provided to an antenna 108 and/or to a feedback loop 134. The feedback loop 134 includes a processing system 135 which itself includes at least one processor 136, memory 137, and a signal analyzer (e.g. spectrum analyzer 109 of FIG. 1). The processing system 135 receives the combined first and second constant-envelope signals as inputs, and analyzes these received signals to identify one or more pre-equalization inputs 139 which, when applied to the first and/or the second linear pre-equalizers 103A/103B, equalize the first and/or second constant-envelope signals 132A/132B relative to each other.

These identified pre-equalization inputs 139 are then provided to the first and/or the second linear pre-equalizers 132A/132B to equalize the signals relative to each other. Once equalized, the first pre-equalized constant-envelope signal 133A and the second pre-equalized constant-envelope signal 133B are provided to the combiner 107 and combined to produce an output signal which, as noted above, is sent to the antenna 108 and/or to the feedback loop 134.

Method 300 of FIG. 3 includes receiving a combined constant-envelope signal that was combined by an analog combiner that received two separate, first and second constant-envelope signals as inputs (310). For example, the processing system 135 of FIG. 2 can receive a combined constant-envelope signal that is output from the analog combiner 107. The analog combiner 107 may receive the first and second constant-envelope signals 132A/132B from the first and second linear pre-equalizers. If the feedback loop 134 has not yet run through an iteration, the pre-equalizers may not have applied any pre-equalization inputs and, as such, the signals 132A/132B may have passed through the pre-equalizers without being substantially effected.

Method 300 next includes analyzing the received combined constant-envelope signal to identify one or more pre-equalization inputs which, when applied at first and second linear pre-equalizers, equalize the first and second constant-envelope signals relative to each other (320). The signal analyzer 138 (e.g. a spectrum analyzer) may analyze the combined constant-envelope signal to determine which pre-equalization inputs 139 should be applied at each linear pre-equalizer 103A/103B. In some cases, the pre-equalization input is based on differences in signal characteristics between the two signals that were combined. Each signal passes through a chain of digital and/or analog components (e.g. component chains 106A/106B), and each signal is affected by those components. Each may add distortions or non-linearities due to differences in materials, differences in operating temperature or other variations.

Once the pre-equalization inputs have been identified that will equalize the signals relative to each other or to a specified constant, method step 330 may be performed in which the identified pre-equalization inputs 139 are provided to the first and the second linear pre-equalizers 132A/132B. As such, the first and second linear pre-equalizers apply the received pre-equalization inputs to the first and second constant-envelope signals, and the first and second constant-envelope signals are equalized relative to each other. This relative equalization technique may be used with very low frequencies to very high frequencies, as the first and second constant-envelope signals 132A/132B are frequency agnostic. Moreover, this relative equalization technique may be used with many different types of waveforms including hopping, spread, OFDM and high-order modulations, as the first and second constant-envelope signals are modulation agnostic.

When the variable-envelope signal 130 is first received (or generated), it is separated into the first and second constant-envelope signals 132A/132B using an outphasing separator 102. The outphasing separator 102 is typically a digital component which performs self-consistent outphasing signal separation using a variety of trigonometric and other mathematical functions to perform the separation. The outphasing separator and the first and second linear pre-equalizers 103A/103B may be designed to support a specified portion of a given frequency spectrum. For instance, if a specified overall expanded frequency spectrum is supported, the outphasing separator 102 and/or the first and second linear pre-equalizers 103A/103B may support a certain limited portion of overall expanded frequency spectrum that is supported at any given point in time.

Pre-equalization inputs 139 provided by the linear pre-equalizers 103A/103B are designed to resolve physical component-based differences in the first and second analog component chains. As noted above, the first and second analog component chains 106A/106B may include mixers, filters, amplifiers or other components that the signals will travel through, including the analog combiner 107. Each (or at least some) of these physical component-based differences is identified by the signal analyzer 138, and is compensated for using the pre-equalization inputs 139. The first and second linear pre-equalizers may each be individually adjusted. As such, when the combined first and second constant-envelope signals are received at the end of the first and second analog component chains, the pre-equalizer adjustments 139 compensate for relative signal differences between the first and second constant-envelope signals. In some cases, one pre-equalizer may make heavier corrections, while the other pre-equalizer may make lighter corrections.

Figure 4A:
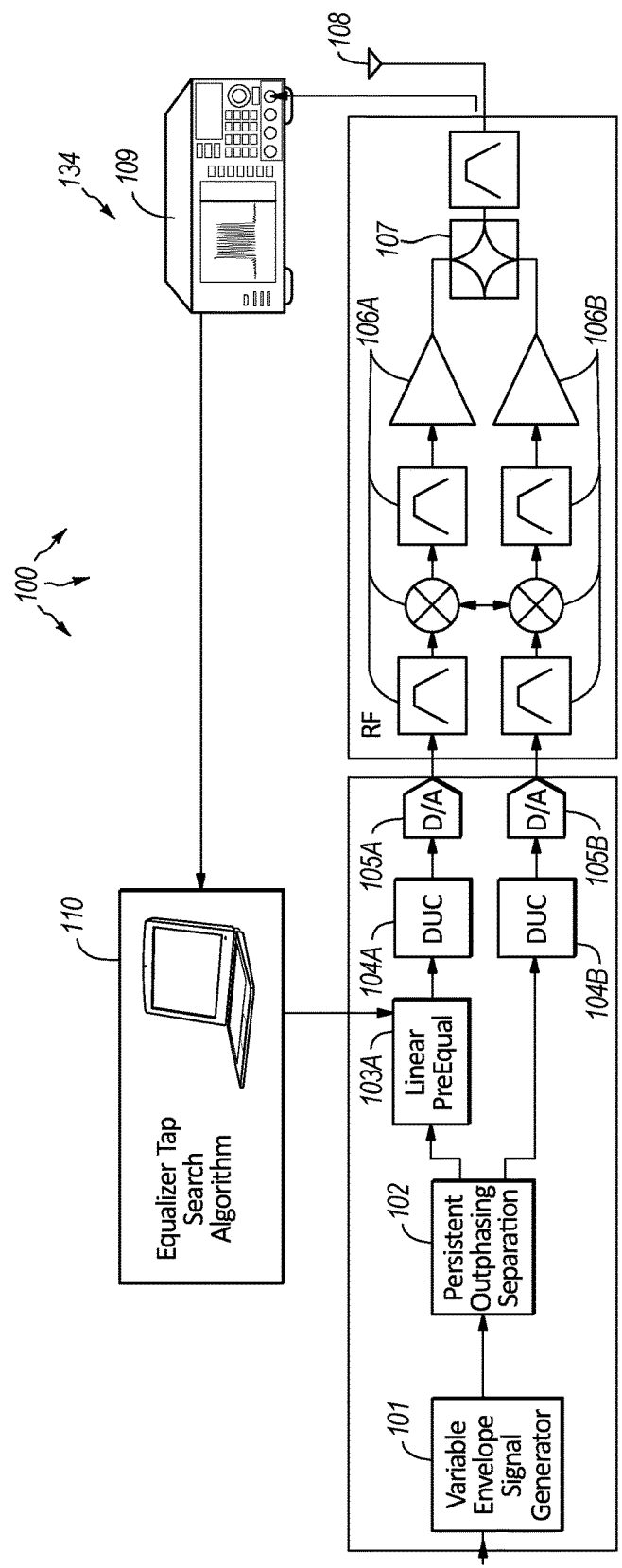
FIGS. 4A and 4B illustrate alternative electronic component architectures in which a single pre-equalizer is used.
Figure 4B:
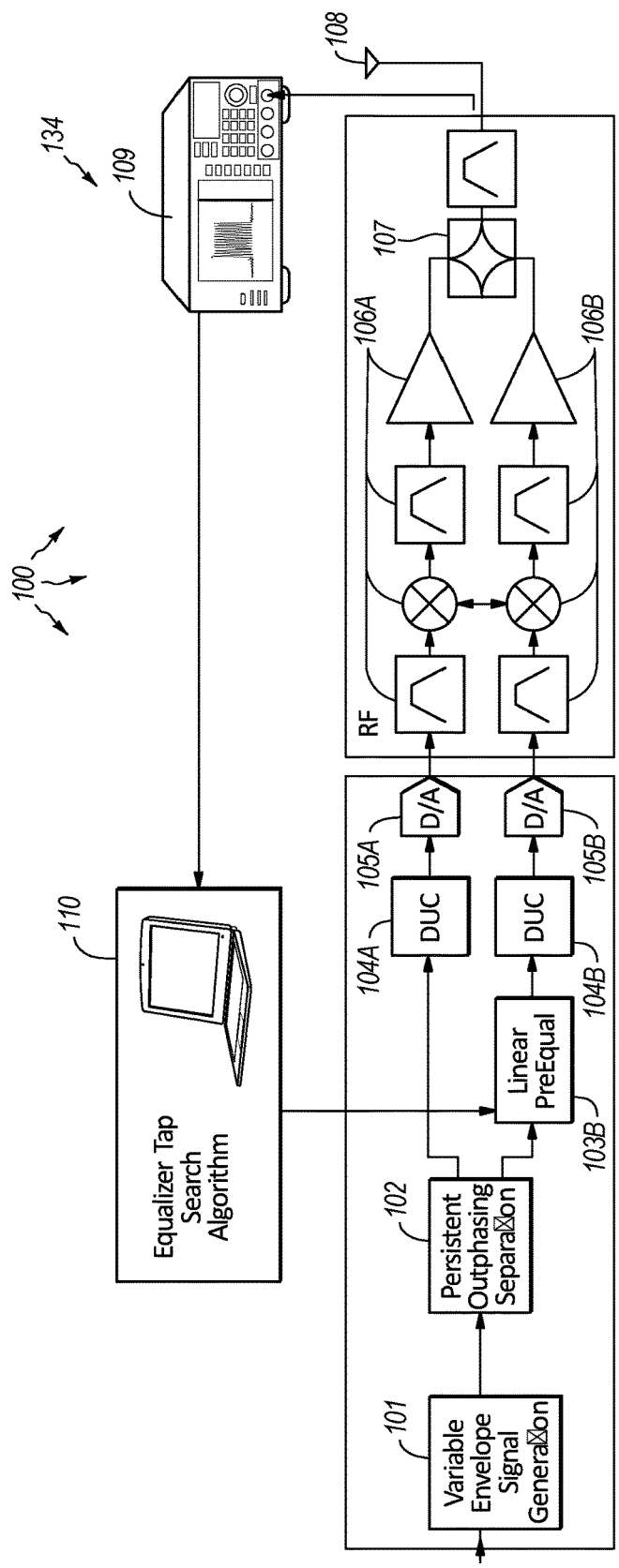

In some embodiments, as shown in FIGS. 4A and 4B, only one pre-equalizer may be used. For instance, in FIG. 4A, the second linear pre-equalizer 103B is omitted, and the second constant-envelope signal from the outphasing separator 102 is sent directly to the DUC 104B, the D/A 105B and the component chain 106B. Similarly, in FIG. 4B, the first linear pre-equalizer 103A is omitted, and the first constant-envelope signal from the outphasing separator 102 is sent directly to the DUC 104A, the D/A 105A and the component chain 106A. In each case, the signal analyzer 138 may still analyze the signal characteristics of the combined signal from the combiner 107 in the feedback loop 134. However, in the embodiments of FIGS. 4A and 4B, the processing system 135 determines pre-equalization inputs for only one pre-equalizer. The inputs are still intended to equalize the first signal 132A to the second signal 132B, but the pre-equalization inputs are applied at only one pre-equalizer.

In some embodiments, the variable-envelope signal 130 received at the receiver 131 is a two-tone signal. The first and second linear pre-equalizers 103A/103B are adjusted according to feedback based on this two-tone signal (e.g. using pre-equalization inputs 139). The gain and phase (or their equivalents) that are then converted to the pre-equalizers may be found in such a way that the IMDs at the output of analog combiner 107 are minimized. In some cases, data may be transmitted in a data signal using the apparatus 100, after the adjustments have occurred using the two-tone signal. This data signal may be continually used to adjust the first and second pre-equalizers. The first and second linear pre-equalizers 103A/103B may, for example, be adjusted to a common flat target determined for each analog component chain 106A/106B. Alternatively, the pre-equalizers may be equalized relative to each other, so that when the pre-equalization inputs 139 are applied, they cancel out the unwanted signal characteristics when the signals are combined by the combiner 107.

The feedback loop 134 shown in FIG. 2 may be a temporary feedback loop that is initially established at calibration, and is subsequently circumvented. Alternatively, the feedback loop may be a substantially permanent feedback loop that is integrated into the apparatus 200 using hardware components and/or software components. In cases where the feedback loop is a temporary loop, it may be used at calibration, and then subsequently used at a later time to re-calibrate the apparatus.

Calibration tables may be used during such a calibration. The calibration tables may be configured to provide inputs regarding operating characteristics of the analog components. For example, the calibration tables may include component values that should be present at specified operating temperature and/or power levels. The calibration may be performed using the calibration tables by scanning over an expanded frequency spectrum and/or over temperature and determining which values are to be used in the pre-equalizer inputs to properly equalize the first constant-envelope signal 132A relative to the second constant-envelope signal 132B. The apparatus thus provides relative equalization of two or more channels for signal processing. This signal processing may be performed for a variety of applications including outphasing, telecommunications, sampling, MIMO, electronic warfare, etc.

Figure 5:
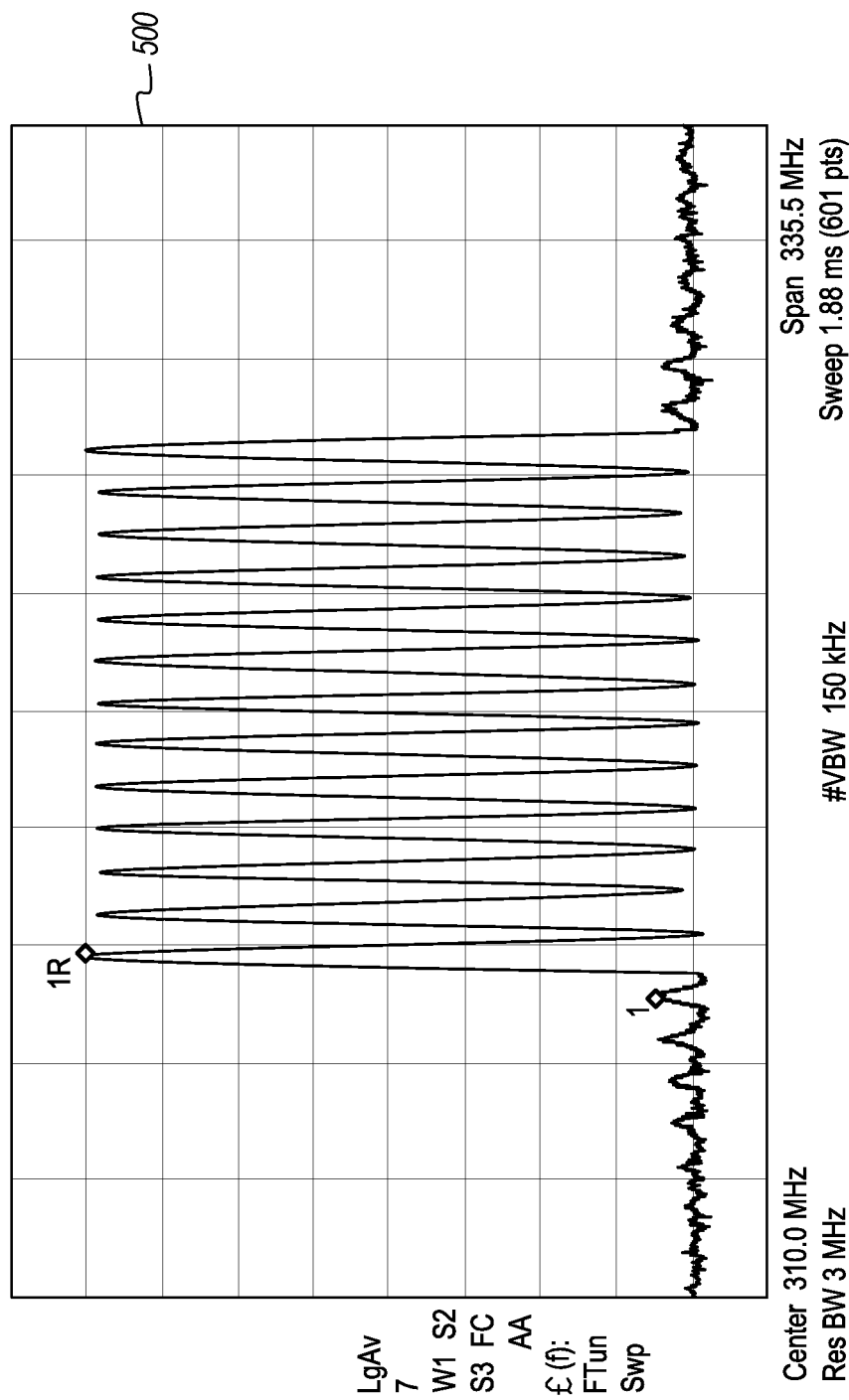
FIG. 5 illustrates an example waveform of an outphased signal with a center frequency of 310.0 MHz.
Figure 6:
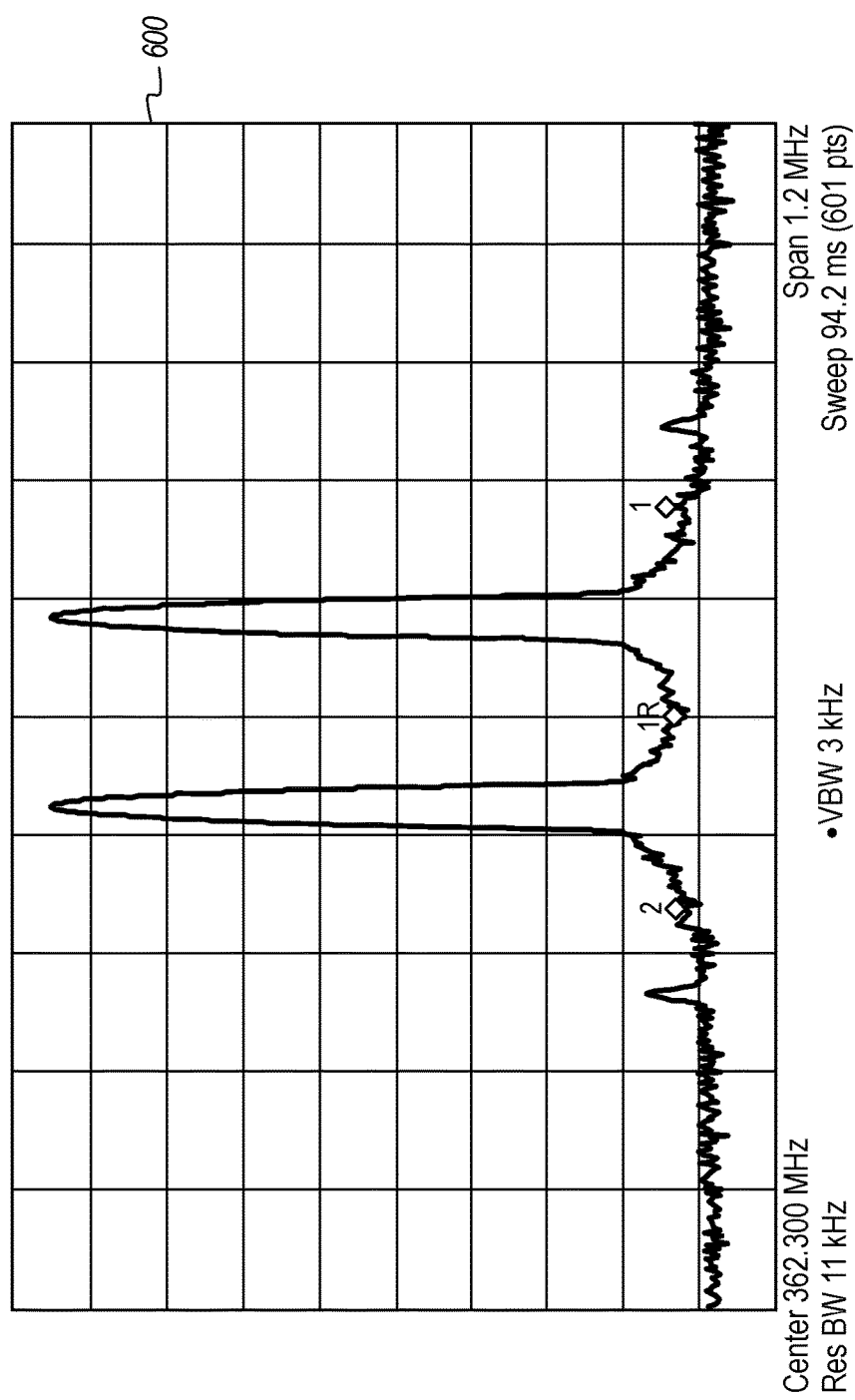
FIG. 6 illustrates an example of a two-tone signal implemented to determine proper pre-equalization inputs.

FIGS. 5 and 6 illustrate charts 500 and 600 where pre-equalization has been applied to a signal. FIG. 5 illustrates a multicarrier waveform with a high degree of spectral purity. The illustrated waveform is a 13-carrier 16 kbps frequency shift keying (FSK) modulated signal with a peak-to-average power ratio (PAPR) of about 11.1 dB. The occupied bandwidth is between approximately 225 MHz and 400 MHz. It should be noted that the spurs are suppressed to unprecedented levels, where approximately 11 dB should be added to the suppression results due to the PAPR of the multicarrier signal. FIG. 6 illustrates an embodiment of a two-tone variable-envelope signal 130, in which most distortions, harmonics and non-linearities have been removed. These results demonstrate high levels of suppression, which cannot be achieved using conventional techniques.

Accordingly, apparatuses and methods are described herein which provide linear equalizers for outphasing amplification. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. An apparatus for relative or absolute equalization of two or more channels, the apparatus comprising:
a receiver configured to receive a variable-envelope signal;
an outphasing separator configured to split the received variable-envelope signal into first and second constant-envelope signals;
a first linear pre-equalizer configured to equalize the first constant-envelope signal relative to the second constant-envelope signal and provide a first pre-equalized constant-envelope signal;
a second linear pre-equalizer configured to equalize the second constant-envelope signal relative to the first constant-envelope signal and provide a second pre-equalized constant-envelope signal;
an analog combiner configured to combine the first and second pre-equalized constant-envelope signals; and
a feedback loop comprising at least one processor configured to:
receive the combined first and second pre-equalized constant-envelope signals as inputs;
analyze the received combined first and second pre-equalized constant-envelope signals to identify one or more pre-equalization inputs that, when applied to the first and/or the second linear pre-equalizers, equalize the first and/or second pre-equalized constant-envelope signals relative to each other; and
provide the identified pre-equalization inputs to the first and/or the second linear pre-equalizers, such that the combined first and second pre-equalized constant-envelope signals are equalized relative to each other.

2. The apparatus of claim 1, further comprising:
a first analog component chain comprising one or more analog electrical components configured to receive and process the first constant-envelope signal; and
a second analog component chain comprising one or more analog electrical components configured to receive and process the second constant-envelope signal.

3. The apparatus of claim 2, wherein the pre-equalization inputs resolve physical component-based differences in the first and second analog component chains including the analog combiner.

4. The apparatus of claim 2, wherein the first and second linear pre-equalizers are each individually adjusted such that upon receiving the combined first and second constant-envelope signals at the end of the first and second analog component chains, the pre-equalizer adjustments compensate for relative signal differences between the first and second constant-envelope signals.

5. The apparatus of claim 1, wherein the variable-envelope signal comprises a two-tone signal.

6. The apparatus of claim 5, wherein the first and second linear pre-equalizers are adjusted according to feedback based on the two-tone signal, and further based on knowledge of the variable-envelope signal and adaptive algorithm.

7. The apparatus of claim 6, wherein data is transmitted in a data signal using the apparatus, upon completion of the adjusting using the two-tone signal.

8. The apparatus of claim 7, wherein at least one of the first or the second pre-equalizers are continually adjusted using the data signal.

9. The apparatus of claim 5, wherein the first and second linear pre-equalizers are adjusted to a common flat target determined for each analog component chain.

10. A method for performing a fundamental optimization function using an adaptive algorithm to minimize distortions as measured at an output of a combiner, the method including:
receiving a combined pre-equalized constant-envelope signal that was combined by an analog combiner that received two separate, pre-equalized first and second constant-envelope signals as inputs;
analyzing the received combined pre-equalized constant-envelope signal to identify one or more pre-equalization inputs which, when applied at first and second linear pre-equalizers, equalize first and second constant-envelope signals relative to each other; and
providing the one or more identified pre-equalization inputs to the first and the second linear pre-equalizers, such that in the combined pre-equalized constant-envelope signal, the first and second constant-envelope signals are equalized relative to each other.

11. The method of claim 10, wherein the first and second constant-envelope signals are frequency agnostic.

12. The method of claim 10, wherein the first and second constant-envelope signals are modulation agnostic.

13. The method of claim 10, wherein the first and second constant-envelope signals are separated using an outphasing separator which performs self-consistent outphasing signal separation.

14. The method of claim 13, wherein the outphasing separator and the first and second linear pre-equalizers support a specified portion of an overall expanded frequency spectrum that is supported at a given point in time.

15. A system configured to provide relative or absolute equalization of two or more RF channels, the apparatus comprising:
   a receiver configured to receive a variable-envelope signal;
   an outphasing separator configured to split the received variable-envelope signal into first and second constant-envelope signals;
   a first linear pre-equalizer configured to equalize the first constant-envelope signal relative to the second constant-envelope signal and provide a first pre-equalized constant-envelope signal;
   a second linear pre-equalizer configured to equalize the second constant-envelope signal relative to the first constant-envelope signal and provide a second pre-equalized constant-envelope signal;
   an analog combiner configured to combine the first and second pre-equalized constant-envelope signals; and
   a feedback loop comprising at least one processor configured to:
   receive the combined first and second pre-equalized constant-envelope signals as inputs;
   analyze the received combined first and second pre-equalized constant-envelope signals in conjunction with a known transmitted variable-envelope signal to identify one or more pre-equalization inputs that, when applied to the first and/or the second linear pre-equalizers, equalize the first and/or second constant-envelope signals relative to each other; and
   provide the identified pre-equalization inputs to the first and/or the second linear pre-equalizers, such that the combined first and second pre-equalized constant-envelope signals are equalized relative to each other or to some known absolute target.

16. The system of claim 15, wherein the feedback loop comprises a temporary feedback loop that is initially established at calibration and is subsequently circumvented.

17. The system of claim 15, wherein calibration tables or equations are built that provide one or more inputs regarding operating characteristics of the analog components.

18. The system of claim 17, wherein the calibration, using the calibration tables, is performed by scanning over an expanded frequency spectrum and/or over temperature, signal power or other specified variables.

19. The system of claim 15, wherein the feedback loop comprises a substantially permanent feedback loop that is integrated into the system using one or more hardware components and/or one or more software components.

20. The system of claim 19, wherein a specified calibration signal and/or a regularly transmitted, data-carrying signal is used for adapting the pre-equalization inputs over time.

* * * * *